US012059878B2

(12) United States Patent
Reifferscheid et al.

(10) Patent No.: US 12,059,878 B2
(45) Date of Patent: Aug. 13, 2024

(54) METHOD FOR CONCEALING OPTICAL DEFECTS IN SURFACES

(71) Applicant: Lufthansa Technik AG, Hamburg (DE)

(72) Inventors: Moritz Reifferscheid, Basedow (DE); Heinrich Huber, Langenbach (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 380 days.

(21) Appl. No.: 17/637,807

(22) PCT Filed: Aug. 26, 2020

(86) PCT No.: PCT/EP2020/073831
§ 371 (c)(1),
(2) Date: Feb. 24, 2022

(87) PCT Pub. No.: WO2021/037899
PCT Pub. Date: Mar. 4, 2021

(65) Prior Publication Data
US 2022/0305767 A1   Sep. 29, 2022

(30) Foreign Application Priority Data

Aug. 27, 2019   (DE) ..................... 10 2019 122 899.9

(51) Int. Cl.
*B32B 37/00*   (2006.01)
*B32B 38/18*   (2006.01)
(Continued)

(52) U.S. Cl.
CPC ........ *B32B 37/025* (2013.01); *B32B 38/1833* (2013.01); *B44C 1/1758* (2013.01); *B32B 2451/00* (2013.01); *B41M 5/03* (2013.01)

(58) Field of Classification Search
None
See application file for complete search history.

(56) References Cited

U.S. PATENT DOCUMENTS 10,300,736 B2 * 5/2019 Mahajan ................ B32B 37/06
2011/0194735 A1   8/2011 Massen
(Continued)

FOREIGN PATENT DOCUMENTS

CN   102159368 A   8/2011
CN   106142725 A   11/2016
(Continued)

*Primary Examiner* — Barbara J Musser
(74) *Attorney, Agent, or Firm* — LEYDIG, VOIT & MAYER, LTD.

(57) ABSTRACT

A method conceals optical defects in surfaces. The method includes: obtaining a digital image by a digital optical recording the optical defect and a surrounding surface; obtaining an imitation of the surface in a region of the at least one optical defect by image processing of the digital image; printing a mirror-inverted, true-to-scale representation of the surface imitation onto a transfer film; soaking the transfer film; applying an activator onto a the transfer film or onto the surface; aligning the transfer film onto the surface so that the surface imitation on the transfer film coincides with the optical defect on the surface; pressing the transfer film onto the surface; peeling the transfer film from the surface; pressing on the ink remaining on the surface; and after complete drying of the activator and of the ink: applying a protective layer onto the surface imitation.

12 Claims, 4 Drawing Sheets

(51) Int. Cl.
    *B41M 5/03*     (2006.01)
    *B44C 1/175*     (2006.01)

(56) References Cited

U.S. PATENT DOCUMENTS

| | | |
|---|---|---|
| 2011/0265953 A1 | 11/2011 | Kroell |
| 2014/0041543 A1 | 2/2014 | Yamamoto |
| 2015/0352822 A1 | 12/2015 | Niebling et al. |

FOREIGN PATENT DOCUMENTS

| | | |
|---|---|---|
| DE | 102010021892 A1 | 12/2011 |
| DE | 102013000400 A1 | 7/2014 |
| EP | 0950540 A2 | 10/1999 |
| EP | 3125527 A1 | 2/2017 |
| WO | WO 2010085946 A1 | 8/2010 |

* cited by examiner

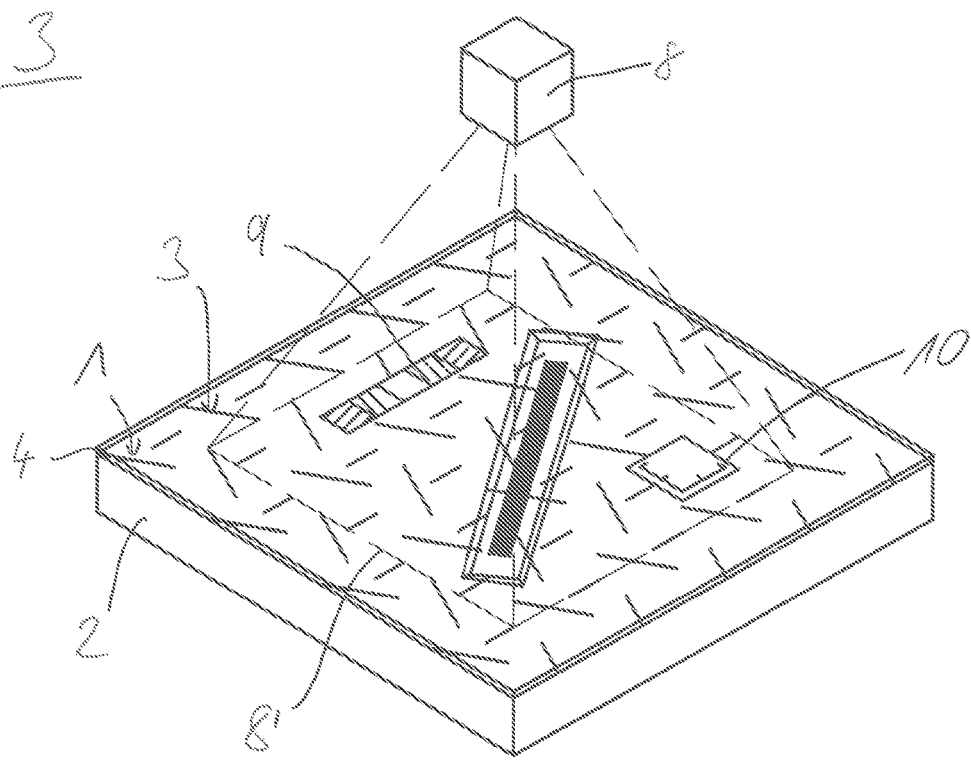
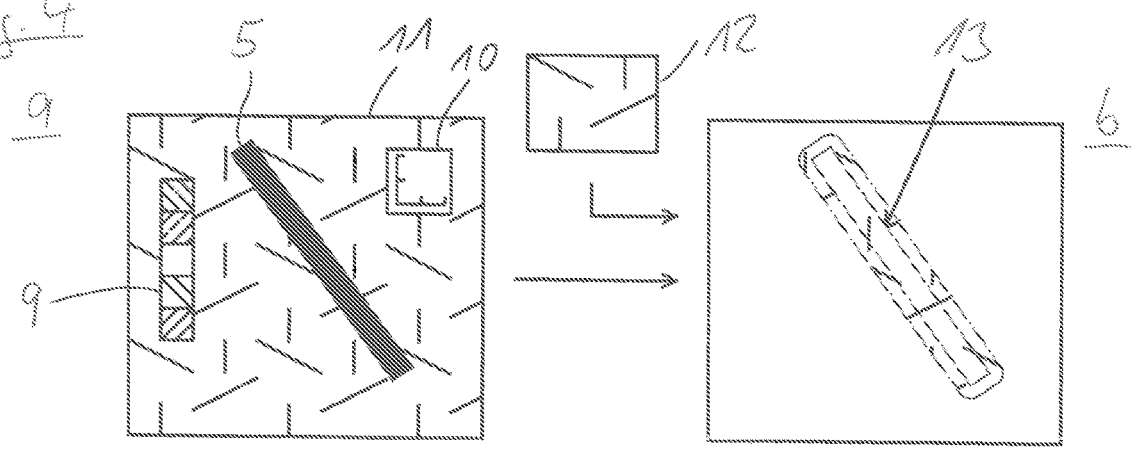
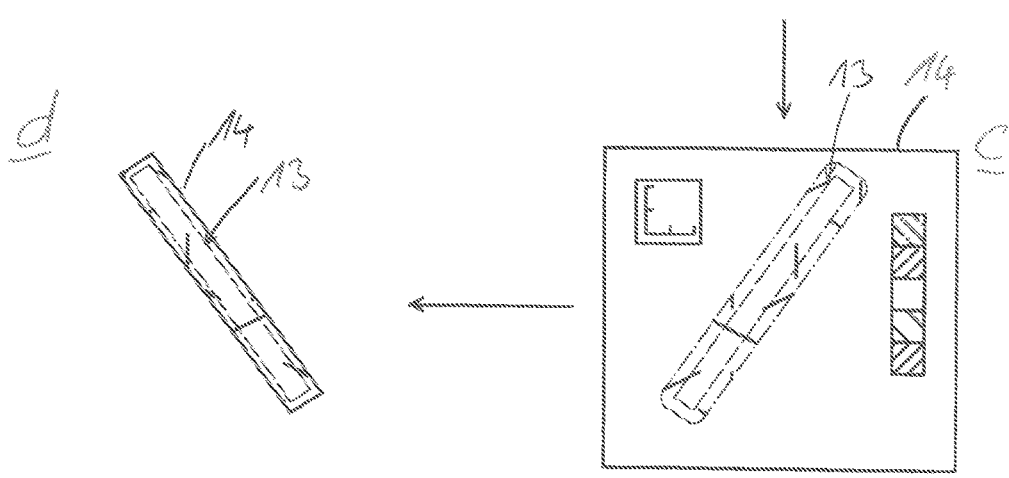

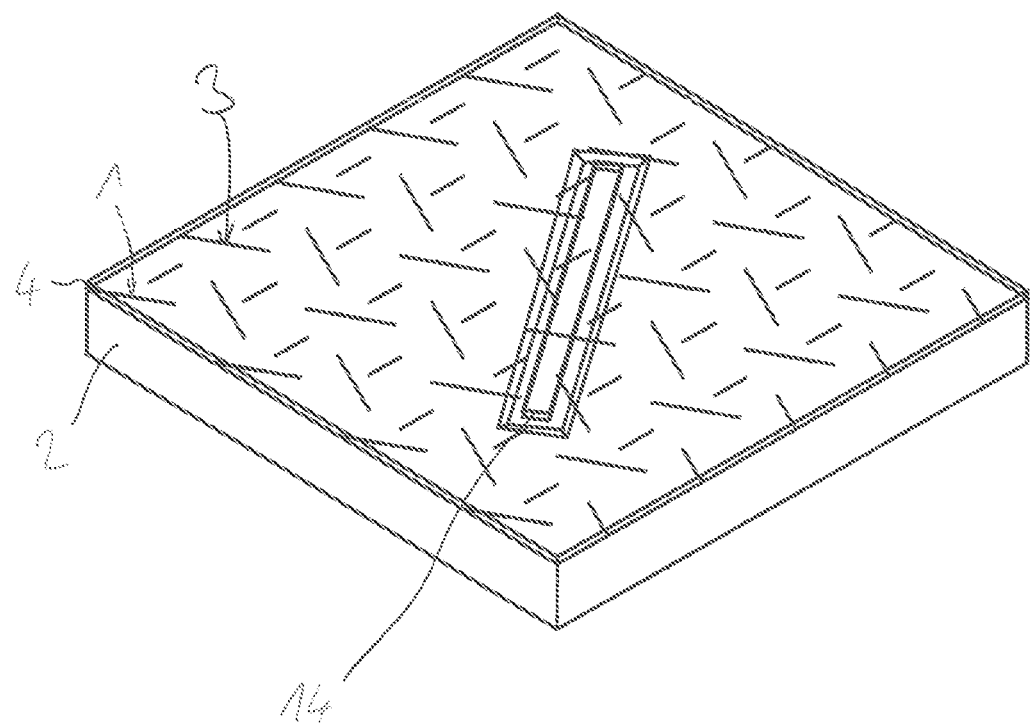

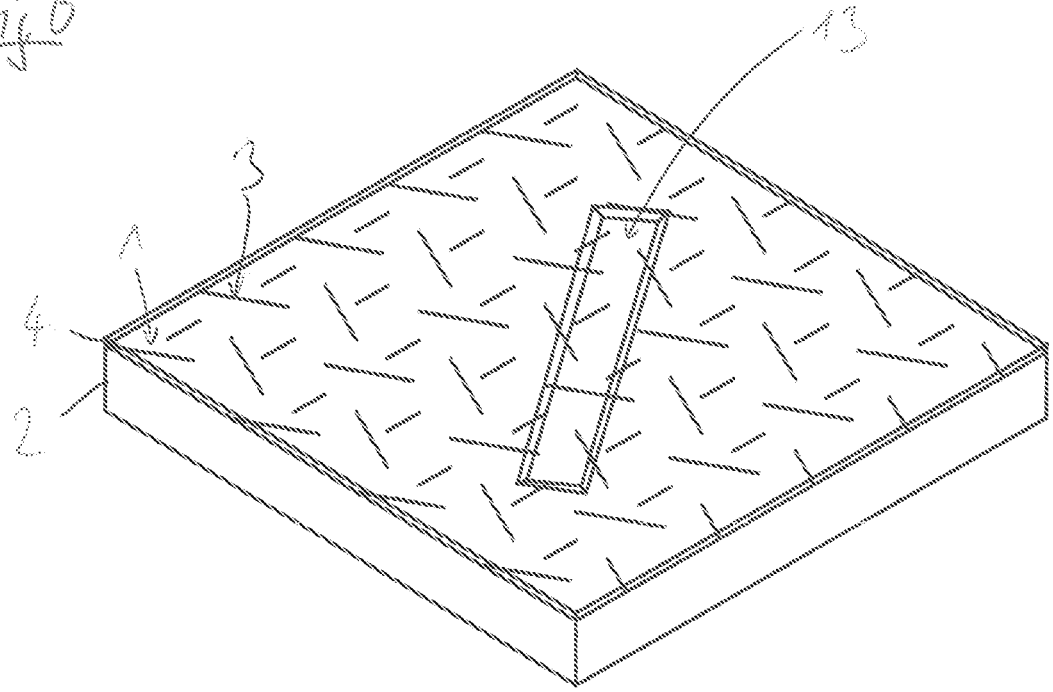
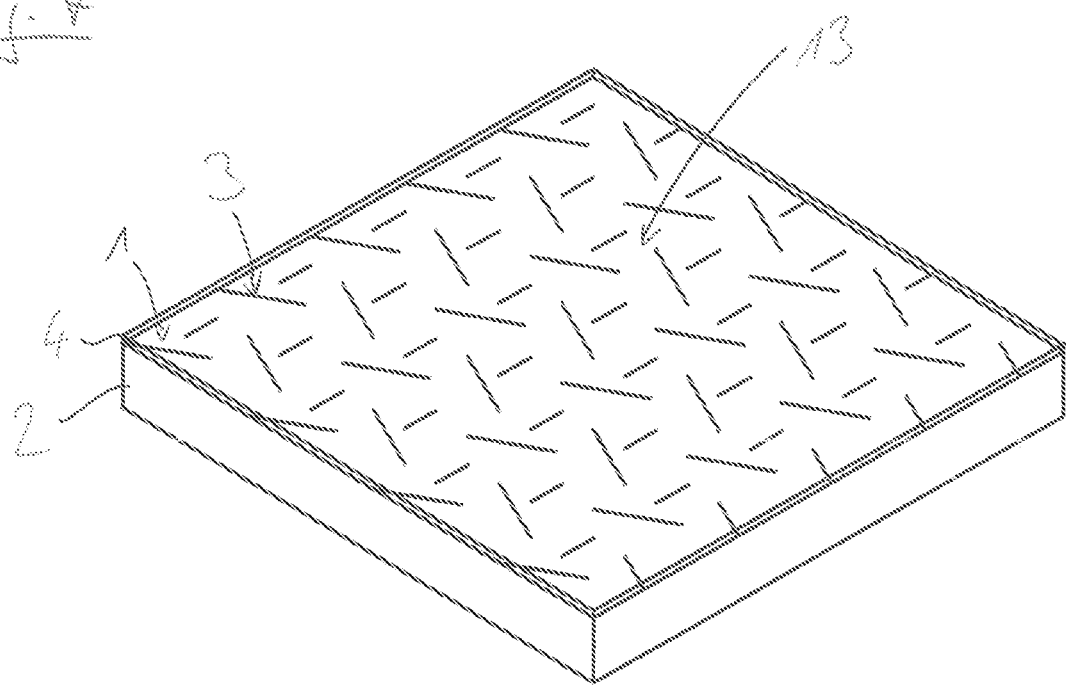

METHOD FOR CONCEALING OPTICAL DEFECTS IN SURFACES

CROSS REFERENCE TO RELATED APPLICATIONS

This application is a U.S. National Phase application under 35 U.S.C. § 371 of International Application No. PCT/EP2020/073831, filed on Aug. 26, 2020, and claims benefit to German Patent Application No. DE 10 2019 122 899.9, filed on Aug. 27, 2019. The International Application was published in German on Mar. 4, 2021 as WO 2021/037899 A1 under PCT Article 21(2).

FIELD

The present disclosure relates to concealing optical defects in surfaces.

BACKGROUND

Those surfaces of objects which are visible in the state of use are regularly provided with a decoration in order to make the object visually attractive. For example, wood surfaces may be provided by varnishes, or patterns are applied, for example printed, onto the surfaces. The desired effect may even be achieved by homogeneous coloration of a surface.

Correspondingly enhanced surfaces may become damaged during use of the object. Typical defects are scratches, dents or spalling, which impair the visual impression of the surface, this generally being undesirable particularly in the case of high-quality surfaces or at least surfaces with a high-quality effect.

While complete replacement or new production of the surface in question may be economically viable for smaller surfaces, in particular of portable objects, this is often not possible for larger surfaces, in particular objects which are fixed in place, for example permanently installed components of the interior furnishings of aircraft cabins, for which reason attempts are made if possible to repair such damaged surfaces in situ.

In the prior art, various manual techniques for concealing optical defects of damaged surfaces are known. The techniques may be combined under the term decorative painting and require great skill and extensive experience in respect of color perception, color matching and execution. Not only is decorative painting time-consuming and cost-intensive, but according to experience bottlenecks in respect of prompt repair may also occur because of the small number of suitable specialists.

SUMMARY

In an embodiment, the present disclosure provides a method conceals optical defects in surfaces. The method includes: obtaining a digital image by a digital optical recording the optical defect and a surrounding surface; obtaining an imitation of the surface in a region of the at least one optical defect by image processing of the digital image; printing a mirror-inverted, true-to-scale representation of the surface imitation onto a transfer film; soaking the transfer film; applying an activator onto a the transfer film or onto the surface; aligning the transfer film onto the surface so that the surface imitation on the transfer film coincides with the optical defect on the surface; pressing the transfer film onto the surface; peeling the transfer film from the surface; pressing on the ink remaining on the surface; and after complete drying of the activator and of the ink: applying a protective layer onto the surface imitation.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIGS. 1-7 show a schematic representation of intermediate steps in the use of the method according to the invention.

DETAILED DESCRIPTION

Figure 1:
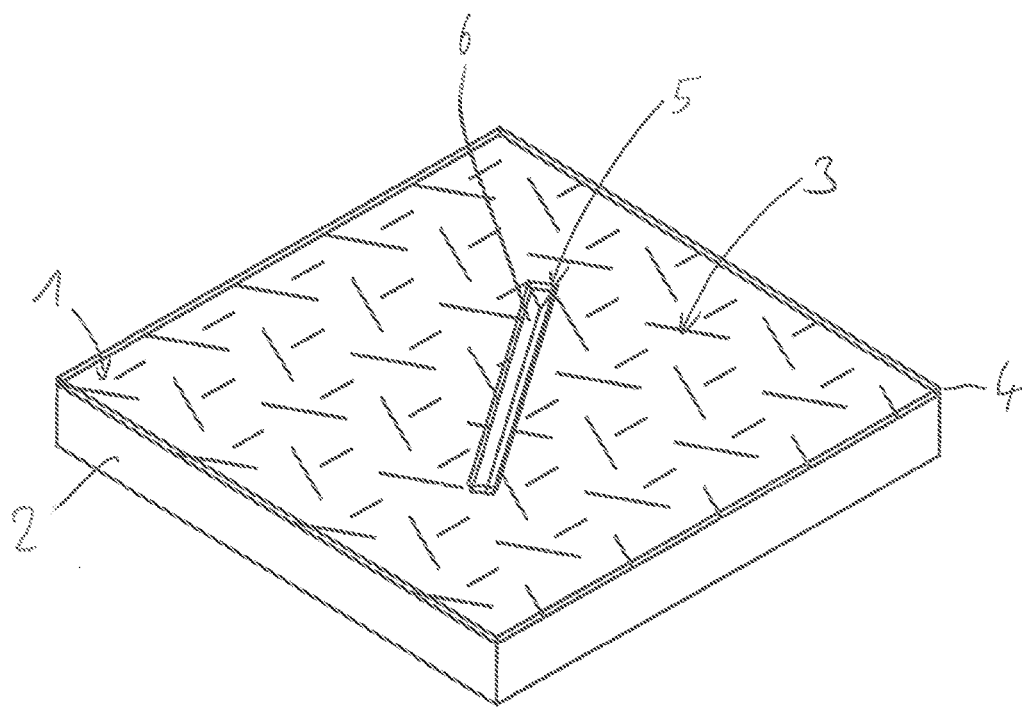

An, at least semiautomated, method for concealing optical defects in surfaces, the results of which are comparable to those of decorative painting but which does not require corresponding specialists for its use, is not known from the prior art.

In an embodiment, the present invention provides a method for concealing optical defects in surfaces, with which the disadvantages from the prior art no longer occur, or only occur to a reduced extent.

Accordingly, an embodiment of the present invention provides a method for concealing optical defects in surfaces, which includes:
 a) digital optical recording of at least one optical defect and the surrounding surface;
 b) imitation of the surface in the region of the at least one optical defect by image processing of the digital image of the optical defect;
 c) mirror-inverted, true-to-scale printing of the surface imitation onto a transfer film;
 d) soaking of the transfer film in order to partially dissolve the ink applied onto the film;
 e) application of an activator onto the printed side of the transfer film in order to make the ink tacky and/or onto the surface in order to bond the ink thereto;
 f) alignment of the transfer film onto the surface so that the surface imitation on the transfer film coincides with the optical defect on the surface;
 g) pressing the transfer film onto the surface;
 h) peeling the transfer film from the surface;
 i) pressing on the ink remaining on the surface;
 j) after complete drying of the activator and of the ink: application of a protective layer onto the surface imitation.

The method according to an embodiment of the invention allows high-quality concealment of optical defects in surfaces, without particularly great skill of the user being required therefor. The use of the method may therefore be scaled rapidly, and thus in principle allows high availability of corresponding repairs.

The method according to one or more embodiments the invention is suitable both for natural surfaces, for example wood with a visible grain, and for surfaces provided with arbitrary patterns. Even monochromatic surfaces may be repaired by the method according to one or more embodiments the invention, the original hue intended for the surface not having to be employed, but the hue actually existing on the surface being imitated so that color deviations in the original coloration of the surface or due to environmental influences in the course of time may also be taken into account.

In a first step of the method according to an embodiment of the invention, at least one optical defect on the surface is digitally optically recorded, in which case besides the optical defect the surface directly surrounding it is also intended to be recorded so that the transition between defective and intact surface is contained on the digital image.

The actual recording may be carried out using a digital image sensor, for example a charge-coupled device (CCD) or complementary metal oxide semiconductor (CMOS) sensor. In this case, it is possible to use a device which is calibrated in respect of the color rendering and/or the imaging scale. In order to comply with the imaging scale, the device may for example comprise suitable spacers for complying with a predetermined distance between the surface with the optical defect and the image sensor. For correct color rendering, it may be configured for automated white balancing, for example by the spacer being jointly recorded by the image sensor, which is then uniformly colored gray in the regions recorded by the image sensor.

As an alternative or in addition, it is also possible to apply a color reference scale and/or a length reference scale, which is jointly recorded during the digital optical recording, temporarily on the surface in the vicinity of the optical defect. The color matching of the digital image, which is possibly required, may then be carried out easily with the aid of the color reference scale. A length reference scale, which is arranged directly in the vicinity of the optical defect on the surface and which preferably has two length scales extending perpendicularly to one another, allows accurate determination of the shape and size of the optical defect independently of the image recording angle, at least on planar surfaces. In this case, it is possible to carry out the digital optical recording with a digital camera known from the prior art, which may even be guided freehand.

If the surface is not planar in the region of the optical defect, it is possible to use known 3D image recording systems in which the shaping of the surface is also recorded besides the actual image data. The 3D image data recorded in this way may then be rolled out onto a plane so that a two-dimensional digital image of the surface is obtained.

It is preferred for the structural damage to the surface in the region of the optical defect to be repaired already, when appropriate, before the digital optical recording. If a part of the surface is spalled or there is a deep scratch, for example, the structural damage may be compensated for by suitable filling and grinding. The repair of possible structural damage to the surface before the digital optical recording offers the advantage that possible treatments of the surface which also affect intact regions, for example smoothing the edge of the structural damage, are also recorded in the digital image so that they may be taken into account directly in the following steps. If this is not necessary, it is sufficient for the repair of possible structural damage to the surface not to be carried out until later, but at the latest when aligning the transfer film on the surface.

Once a digital image of the at least one optical defect and of the surrounding surface has been obtained, the surface in the region of the at least one optical defect may be digitally imitated by image processing, for example on a computer or a mobile terminal. Besides the color matching, patterns of the surface in the region of the optical defect may in this case also be reproduced, in which case the operator may orientate themselves with the pattern of the surrounding surface. The result may be checked, and if necessary refined further, directly on the apparatus used for processing the digital image.

It is preferred for the imitation of the surface in the region of the at least one optical defect to be carried out in an at least semiautomated fashion by pattern recognition of the recorded surrounding surface. To this end, for example, known automated photorestoration methods may be employed. The user may then postprocess the imitation, compiled in an automated fashion, of the surface in the at least one optical defect, if required, in order to achieve the desired result.

Particularly if the surface in the region of the at least one optical defect and the surrounding regions have a predetermined pattern, in particular a regularly repeating pattern, the imitation, compiled in an automated fashion, of the surface in the at least one optical defect may be improved further by comparing the pattern of the recorded surrounding region around the optical defect with a predetermined pattern—in particular the pattern used for the initial production of the surface. Methods for corresponding pattern comparison are known. The predetermined pattern may then be aligned according to the pattern of the recorded surrounding surface and continued over the optical defect. The color matching of the continued pattern is then furthermore preferably carried out with the aid of the surrounding surface.

Once the imitation of the surface by image processing has been completed, the surface imitation is printed true-to-scale but mirror-inverted onto a transfer film. "True-to-scale" means in this context that the printed surface imitation has the appropriate size for the optical defect. It is also possible for an edge from the digital image of the surface surrounding the defect to be jointly printed as well around the actual surface imitation. In this way, the provision of a smooth transition between the intact surface and the concealment may be facilitated.

The printing of the surface imitation onto the transfer film is preferably carried out by laser printing, so that the ink is a toner. The use of laser printers is advantageous because of their high availability and good printing results.

The transfer film is preferably configured to be transparent, so that the subsequent alignment of the transfer film on the surface is simplified. The transfer film may, for example, be made of polyvinyl acetate.

Besides the surface imitation, a color reference scale may preferably also be jointly printed on the transfer film. With the aid of this color reference scale, it is possible to check whether the printing of the surface imitation has been carried out with sufficient color accuracy. If the printed color reference scale corresponds with a digital color reference scale jointly recorded during the digital optical recording or if the digital image of the recorded color reference scale is jointly printed, by direct comparison of the two color reference scales it is possible to ensure that the printed surface imitation has the coloration selected for the surface imitation.

Similarly, a length reference scale which, for example, is comparable to the length reference scale used during the recording, may be jointly printed. By checking of the printed length reference scale and/or comparison with the length reference scale used during the recording, it is possible to check whether the printing has actually been carried out true-to-scale.

The printed color reference scale and/or length reference scale may preferably be removed before the subsequent soaking by suitable trimming of the transfer film on the surface, but at the latest before the alignment of the transfer film. Analogously the transfer film may be trimmed before the subsequent soaking, but at the latest before the alignment of the transfer film on the surface over the region of the surface imitation. By corresponding trimming, the subsequent handling of the transfer film may be simplified.

The printed transfer film is subsequently soaked in order to partially dissolve the ink, i.e. to reduce the adhesion between the ink and the transfer film. Depending on the ink, it is sufficient to soak the transfer film for about 30 to 180 seconds in water.

Subsequently, an activator is applied onto the printed side of the transfer film in order to make the ink tacky on the side facing away from the film, and/or the activator is applied directly onto the surface so that the ink aligned and pressed on the surface in the following steps bonds thereto. A corresponding activator, which may preferably be sprayed directly on the transfer film at least for the application, in order not to smudge the already partially dissolved ink, may be tailored to the ink and, for example, comprise one of the following constituents: ethyl acetate, 4-methylpentan-2-one or 2-butoxyethanol. A corresponding activator may also be used for direct application on the surface. If the activator is applied only onto the surface, however, an adhesive may also be used as the activator. The adhesive is in this case to be selected so that on the one hand the ink bonds sufficiently thereto, and on the other hand the transfer film can be peeled off without leaving residues.

The transfer film is then aligned on the surface in such a way that the surface imitation on the transfer film coincides with the optical defect on the surface. In this case, the transfer film may for example be aligned with the edge of the printed surface imitation on the edge of the optical defect. If the transfer film is transparent, the pattern of the surface imitation may in addition also be compared with the pattern of the surface surrounding the optical defect, in order to avoid a visible transition between the original intact surface and the surface imitation.

Once the transfer film is aligned on the surface, it is subsequently pressed on. Bonding of the ink and the surface therefore takes place, the ink and/or surface already having been made tacky beforehand with an activator and/or adhesive, or the ink comes in contact with an activator applied there, and therefore becomes tacky, only during contact with the surface. As already explained above, the surface is preferably repaired in respect of possible structural damage in the region of the optical defect at the latest at this instant, so that the surface is generally also planar in the region of the optical defect, by means of which it is readily possible to press the transfer film on.

After the pressing of the film, the ink bonds to the surface so that the transfer film can be peeled off. The adhesion to the surface is in this case ensured by the activator, while the detachability of the transfer film is provided by the soaking to partially dissolve the ink from the transfer film.

Once the transfer film is removed, the ink may be pressed on again. To this end, an antiadhesion-coated stamp is preferably used in order to prevent the ink from bonding to the stamp.

After the activator and ink have been fully dried, a protective layer is subsequently also applied onto the surface imitation, for example in order to protect the ink from moisture. The protective layer may in this case be matched in gloss level to the surrounding surface and/or may for example comprise a transparent topcoat lacquer.

After these steps have been carried out, the at least one optical defect is concealed in such a way that it can generally not be seen, or can scarcely be seen any longer.

FIG. 1 shows a part of the surface 1 of an object 2—in this case an item of furniture fixed in place in the cabin of a passenger aircraft. The surface 1 is decorated with a regularly repeating pattern 3, which is printed directly onto the surface 1. The pattern 3 is provided with a protective layer 4 consisting of a transparent topcoat lacquer.

In the represented part of the surface 1, there is an optical defect 5 associated with structural damage 6. The structural damage 6 has the form of a score or a deep scratch, and could result for example from powerful impact with the sharp edge of an object.

Figure 2:
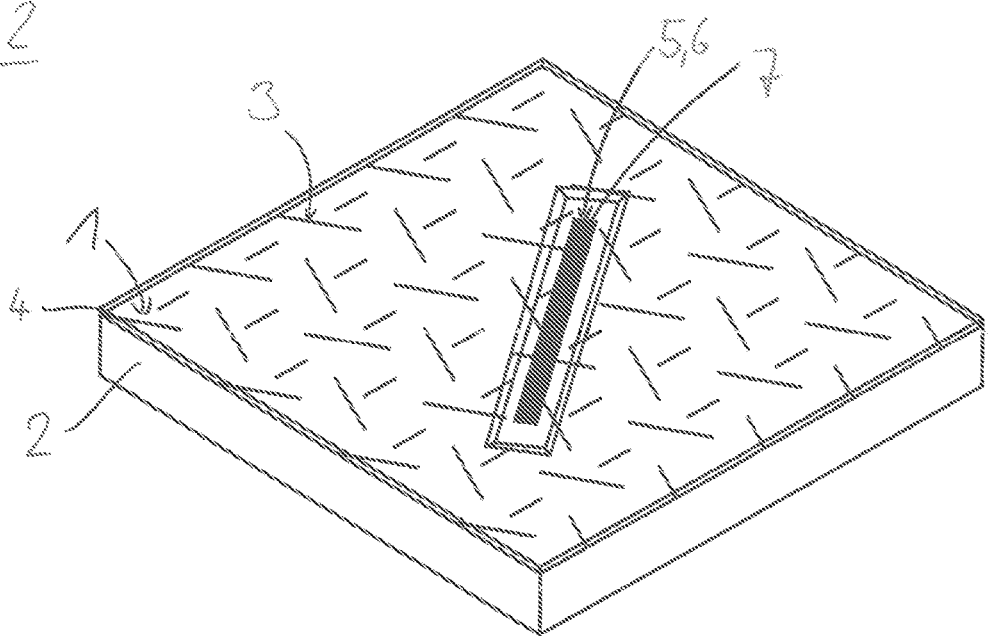

In order to conceal the optical defect 5, the structural damage 6 is initially repaired (FIG. 2). To this end, the structural damage 6 is filled with a filling compound 7 and ground flush with the surface 1. That parts of the protective layer 4 in the immediate vicinity of the defect 5 may in this case also be removed is unimportant, and may even be advantageous for the subsequent alignment and pressing on of the transfer film 14 (cf. FIG. 5).

The optical defect 5 together with the surrounding surface 1 is then digitally optically recorded with the aid of a digital camera 8 (FIG. 3). In the acquisition region 8' of the digital camera 8, a color reference scale 9 and a length reference scale 10 having two length scales extending perpendicularly to one another are placed onto the surface 1 for the duration of the recording, it being possible with the aid of these to determine the scale, possible distortions due to the acquisition angle and the color rendering of the digital image 11, acquired by the digital camera 8, of the optical defect 5.

The digital image 11 of the optical defect 5, acquired by the digital camera 8 and rectified with the aid of the length reference scale 10, is represented in FIG. 4a.

The optical defect 5 is identified on the digital image 11 by automated pattern recognition. Furthermore, the pattern 3 of the surface 1 around the optical defect 5 is identified and compared with a predetermined pattern 12, so that the pattern 3 of the surface 1 can be supplemented on the digital image 11 with an appropriate surface imitation 13 with the aid of the predetermined pattern 12. If there is no predetermined pattern 12, for example because the surface 1 is a natural wood surface with a grain, photorestoration methods may also be employed in order to compile a surface imitation 13.

The surface imitation 13 generated in an automated fashion for the optical defect 5, as well as the pattern 3 in the region of the surface 1 immediately around the optical defect 5, are provided as a digital image 11' for the image processing (FIG. 4b). In this step, corrections may be carried out on the surface imitation 13 generated in an automated fashion. It is also possible to reject the surface imitation 13 generated in an automated fashion and to develop a surface imitation 13 freely on the basis of the digital image 11.

The surface imitation 13 for the optical defect 5 and the pattern 3 of the surrounding surface 1 is then printed by laser printing, mirror-inverted and true-to-scale, onto a transparent transfer film 14 made of polyvinyl acetate (FIG. 4c). In the same step, a color reference scale 9' and a length reference scale 10', which correspond to the reference scales 9, 10 used during the digital optical recording, are printed onto the transfer film 14 (cf. FIG. 3). By comparing the color reference scales 9, 9' and the length reference scales 10, 10', it is possible to ensure that the printed surface imitation 13 is accurately colored and true-to-scale with respect to the surface 1, or its pattern 3.

The transfer film 14 may then be trimmed to the region of the surface imitation 13 and of the region immediately adjacent (FIG. 4d), which after the transfer film 14 is turned over—as may be seen in comparison with FIG. 4a—fits onto the optical defect 5.

The transfer film 14 is then—depending on the toner used as ink—soaked for about 30 to 180 seconds in water, so that the ink on the transfer film 14 is partially dissolved. The ink on the transfer film 14 is then sprayed with an activator based on ethyl acetate, which makes the ink tacky on the side facing away from the transfer film 14. The activator may also be applied directly on the surface 1 in the region of the optical defect 5, so that the ink becomes tacky only during contact with the surface 1. As an alternative thereto, it is also possible to make the surface 1 tacky in the region of the optical defect 5 with the aid of an adhesive, in such a way that the ink bonds thereto in the subsequent steps.

The transfer film 14 is then aligned on the optical defect 5 on the surface 1 (FIG. 5). The alignment is simple to check because of the transparency of the transfer film 14, specifically in particular at the transition from the surface imitation 13 on the transfer film 14 to the pattern 3 on the surface 1.

Once the transfer film 14 is correctly aligned, it may be pressed on so that bonding takes place between the activated ink and the surface 1. The transfer film 14 may then be peeled off, while the ink remains on the surface 1 (FIG. 6).

The ink remaining on the surface 1 may then be pressed on even more with an antiadhesion-coated stamp, before the ink and the activator have fully dried.

Once the drying is completed, the protective layer 4 is produced again in the region of the surface imitation 13 by applying a topcoat lacquer, the gloss level of which matches with the protective layer 4 in the other region of the surface 1.

After the protective layer 4 has dried, the originally existing optical defect 5 (cf. FIG. 1) is fully concealed and can practically no longer be seen.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for concealing optical defects in surfaces, the method comprising:
   a) obtaining a digital image by a digital optical recording of at least one optical defect and a surrounding surface;
   b) obtaining an imitation of the surface in a region of the at least one optical defect by image processing of the digital image of the at least one optical defect;
   c) printing a mirror-inverted, true-to-scale representation of the surface imitation onto a transfer film;
   d) soaking the transfer film in order to partially dissolve ink applied onto the transfer film;
   e) applying an activator onto a printed side of the transfer film in order to make the ink tacky or onto the surface in order to bond the ink thereto;
   f) aligning the transfer film onto the surface so that the surface imitation on the transfer film coincides with the optical defect on the surface;
   g) pressing the transfer film onto the surface;
   h) peeling the transfer film from the surface;
   i) pressing on the ink remaining on the surface; and
   j) after complete drying of the activator and of the ink: applying a protective layer onto the surface imitation.

2. The method as claimed in claim 1, the method comprising, before the alignment of the transfer film, repairing structural damages of the surface in the region of the at least one optical defect.

3. The method as claimed in claim 1, wherein the imitation of the surface in the region of the at least one optical defect is carried out in an at least semiautomated fashion by pattern recognition of the recorded surrounding surface.

4. The method as claimed in claim 3, wherein the pattern of the recorded surrounding surface around the optical defect is compared in the at least semiautomated fashion with a predetermined pattern.

5. The method as claimed in claim 1, wherein a defined color reference scale or a length reference scale are jointly recorded during the digital optical recording of the at least one optical defect and of the surrounding surface.

6. The method as claimed in claim 1, wherein a color reference scale or a length reference scale are jointly printed during the printing of the surface imitation onto the transfer film.

7. The method as claimed in claim 1, wherein the printing of the surface imitation onto the transfer film is carried out by laser printing and the ink is toner.

8. The method as claimed in claim 1, wherein the transfer film is transparent or made of polyvinyl acetate.

9. The method as claimed in claim 1, wherein the transfer film is trimmed to the region of the surface imitation before the alignment on the surface.

10. The method as claimed in claim 1, wherein the activator comprises at least one of the following constituents: ethyl acetate, 4-methylpentan-2-one, or 2-butoxyethanol.

11. The method as claimed in claim 1, wherein the protective layer comprises a topcoat lacquer or is matched in gloss level to the surface.

12. The method as claimed in claim 1, wherein the structural damages of the surface in the region of at least one optical defect are repaired before the digital optical recording.

* * * * *